US008595403B2

(12) United States Patent
Choi et al.

(10) Patent No.: US 8,595,403 B2
(45) Date of Patent: Nov. 26, 2013

(54) DISPLAY APPARATUS

(75) Inventors: Hoon Choi, Yongin-si (KR); Jae-hyun Jeong, Anyang-si (KR); Kwang-youn Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 13/241,465

(22) Filed: Sep. 23, 2011

(65) Prior Publication Data

US 2012/0113079 A1 May 10, 2012

(30) Foreign Application Priority Data

Nov. 10, 2010 (KR) ........................ 10-2010-0111355

(51) Int. Cl.
*G06F 13/00* (2006.01)

(52) U.S. Cl.
USPC ........................................... 710/300; 348/300

(58) Field of Classification Search
USPC ........................... 710/300–304; 348/552–570
See application file for complete search history.

(56) References Cited

FOREIGN PATENT DOCUMENTS

| | | | | |
|---|---|---|---|---|
| KR | 10-2008-0000329 | A | | 1/2008 |
| KR | 10-2008-0065790 | A | | 7/2008 |
| WO | 2008/084919 | A1 | | 7/2008 |
| WO | WO 2008084919 | A1 | * | 7/2008 |

* cited by examiner

*Primary Examiner* — Clifford Knoll
(74) *Attorney, Agent, or Firm* — Sughrue Mion, PLLC

(57) ABSTRACT

Provided is a display apparatus including an image processing module and a display main body, wherein the image processing module includes: an image signal processor processing an image signal; a module terminal transmitting the processed image signal in a wired manner; and a module wireless communication unit transmitting wirelessly the processed image signal, and wherein the display main body includes: a main body terminal receiving the image signal from the module terminal which is detachably connected to the main body terminal; a main body wireless communication unit receiving the image signal from the module wireless communication unit; and a display unit displaying an image corresponding to the image signal; and a controller controlling the image signal to be transmitted selectively from the module terminal to the main body terminal or from the module wireless communication unit to the main body wireless communication unit.

20 Claims, 8 Drawing Sheets

DISPLAY APPARATUS

CROSS-REFERENCE TO RELATED APPLICATION

This application claims priority from Korean Patent Application No. 10-2010-00111355, filed on Nov. 10, 2010, the disclosure of which is incorporated herein in its entirety by reference.

BACKGROUND

1. Field

Apparatuses and methods consistent with the exemplary embodiments relate to a display apparatus which displays an image with an image signal received from the outside, and more particularly, to a display apparatus which has an improved installation configuration of processing an image corresponding to an installation location of a display main body.

2. Description of the Related Art

A display apparatus processes an image signal input from the outside according to various image processing operations and displays an image based on the processed image signal. Generally, the display apparatus may be a television (TV) or a computer monitor. To perform the foregoing operation, the display apparatus includes a display panel to display an image thereon, and an image processing board to process and output an image signal received from the outside to the display panel.

The display panel and the image processing board are accommodated in a single casing to form a display main body. The display apparatus may further include a stand to support the display main body. The display main body is supported by the stand on a flat surface.

Technological development makes the display panel larger and slimmer, and an increasing number of display panels are hung on the wall, instead of being supported by the stand, to meet users' demand. If the display main body is hung on the wall, a supporting frame may be installed on the wall to be coupled with the display main body, or the display main body may be partly embedded in the wall.

However, if the display main body is hung on the wall as above, a wired connection for the input of an image signal from the outside is not that feasible compared to the display main body supported by the stand. In particular, an increased number of image supply sources connected to the display main body in a wired manner may aggravate the foregoing problem.

SUMMARY

One or more exemplary embodiments may be achieved by providing a display apparatus including: an image processing module which comprises: an image signal processor which processes an image signal received from the outside; a module terminal which transmits the image signal processed by the image signal processor in a wired manner; a module wireless communication unit which transmits wirelessly the image signal processed by the image signal processor; and a module controller which selectively controls the module terminal or the module wireless communication unit to transmit the image signal in a wired manner or wirelessly, respectively; and a display main body which includes: a display panel; a docking unit which is configured to detachably mount the image processing module therein; a main body terminal which receives the image signal transmitted from the module terminal if the module terminal is connected to the main body terminal through the docking unit; a main body wireless communication unit which receives the image signal wirelessly transmitted from the module wireless communication unit; and a main body controller which selectively controls the main body terminal or the main body wireless communication unit to receive the image signal in the wired manner or wirelessly, respectively, wherein the module controller and the main body controller control the image signal to be transmitted from the module terminal to the main body terminal in the wired manner or from the module wireless communication unit to the main body wireless communication unit wirelessly, depending on whether the module terminal is connected to the main body terminal.

The module controller and the main body controller may activate the module wireless communication unit and the main body wireless communication unit, respectively, if the module terminal is not connected to the main body terminal, and may deactivate the module wireless communication unit and the main body wireless communication unit, respectively, if the main body terminal is connected to the module terminal.

The image processing module may further include a module power supply which is configured to supply power to operate the image processing module, and wherein the module controller controls the module power supply to supply the power to the image processing module, if the module terminal is not connected to the main body terminal.

The module power supply may include at least one of a battery and an adaptor connected to an external power source.

The display main body may further include a main body power supply which supplies power to operate the display main body, and wherein the module controller shuts off power supplied from the module power supply to the image processing module and controls the module terminal to receive power to operate the image processing module from the main body power supply through the main body terminal, if the module terminal is connected to the main body terminal.

The main body terminal and the module terminal may include power supply terminals, respectively, which are connected to each other in a wired manner to supply power from the main body power supply to the image processing module.

The display main body may further include a panel driver which drives the display panel to thereby display an image on the display panel based on the image signal transmitted from the image processing module The display panel may be provided in a front side of the display main body, and the docking unit may be provided in a rear side of the display main body.

The display main body may be supported by a stand on a surface or hung on the wall.

The main body wireless communication unit may be detachably attached to the display main body, and the docking unit may be configured to be detachably mounted in the docking unit.

The main body wireless communication unit may include a communication module wireless communication unit which receives the image signal transmitted wirelessly from the module wireless communication unit; and a communication module terminal which is connected to the main body terminal in a wired manner if the main body wireless communication unit is mounted in the docking unit, and transmits the image signal from the communication module wireless communication unit to the main body terminal.

The communication module may receive power from the display main body through the communication module terminal if the main body wireless communication unit is mounted in the docking unit.

BRIEF DESCRIPTION OF THE DRAWINGS

The above and/or other aspects will become apparent and more readily appreciated from the following descriptions of the exemplary embodiments, taken in conjunction with the accompanying drawings, in which.

DETAILED DESCRIPTION OF EXEMPLARY EMBODIMENTS

Figure 1:
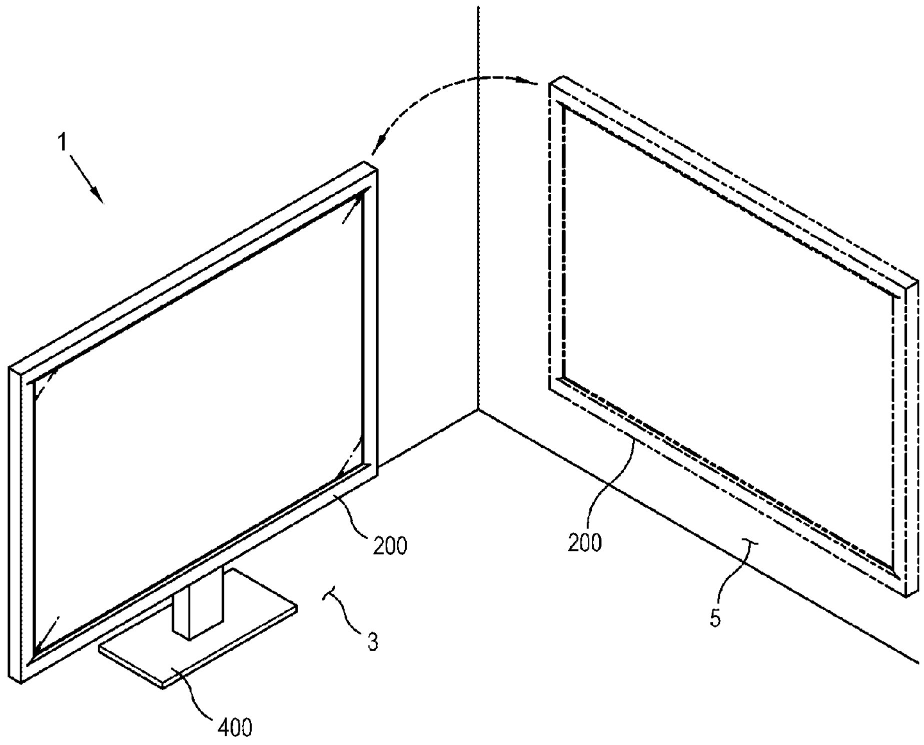
FIG. 1 illustrates a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a display apparatus 1 according to an exemplary embodiment.

As shown therein, the display apparatus 1 according to the present exemplary embodiment includes a display main body 200 which displays an image. The display main body 200 may be supported by a stand 400 on a surface 3 that is substantially plain or hung on a wall 5 that is substantially upright, depending on a user's demand or usage environment. The configuration for making the display main body 200 supported by the stand 400 or hung on the wall 5 may vary by design change, and the descriptions will be omitted.

Figure 2:
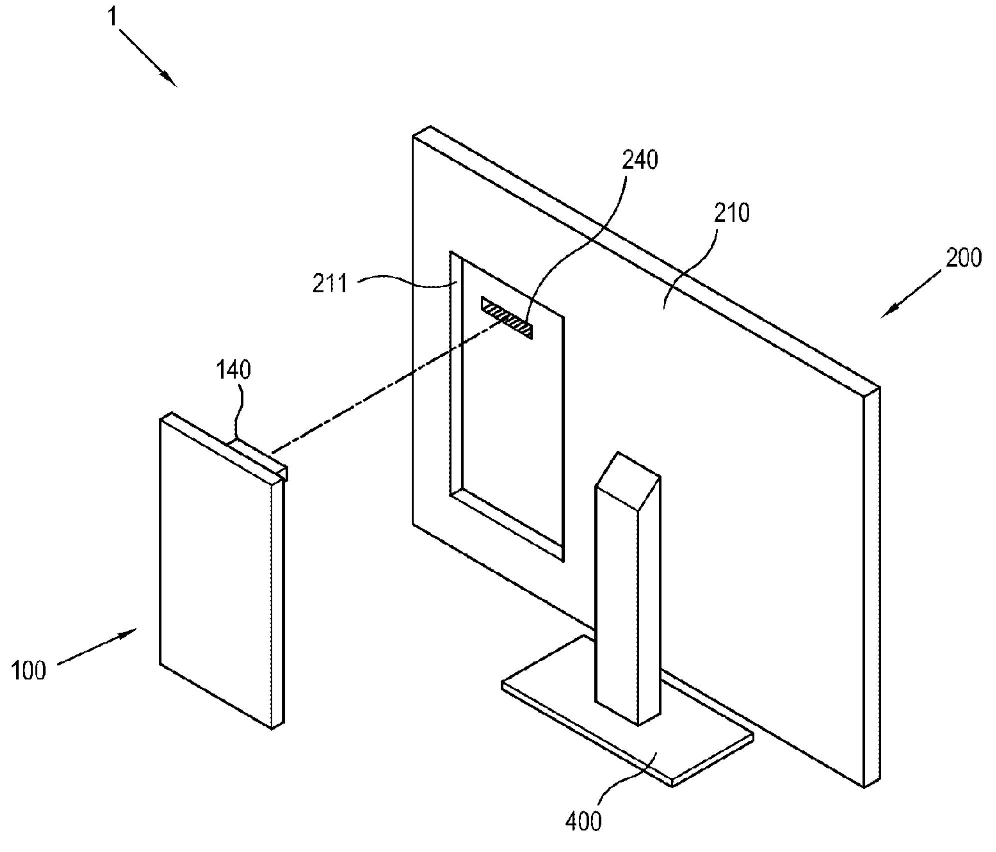
FIG. 2 illustrates the display apparatus whose display main body is supported by a stand, according to an exemplary embodiment.

FIG. 2 is a perspective view of the display apparatus 1 when the display main body 200 is supported by the stand 400.

As shown therein, the display apparatus 1 includes the display main body 200 and an image processing module 100 which is detachably attached to a rear side of the display main body 200.

The image processing module 100 receives an image signal from at least one image supply source (not shown), and selects and processes one of the image signals. The image processing module 100 includes a module terminal 140 which outputs the processed image signal. The module terminal 140 is exposed to the outside of the image processing module 100.

The display main body 200 includes a housing 210 which forms an external appearance. The housing 210 has a display panel (not shown) installed in a front side thereof and displaying an image thereon, and a docking unit 211 provided in a rear side and docked with the image processing module 100.

The docking unit 211 may employ various configurations for the image processing module 100 to be detachably attached to the display main body 200. For example, the docking unit 211 may be depressed from the housing 210 to accommodate therein the image processing module 100 or connected to the image processing module 100 by screw, rivet, pin or hook as long as the docking unit 211 allows the image processing module 100 to be detached from or attached to the display main body 200.

The display main body 200 includes a main body terminal 240 which is formed in a side of the docking unit 211 and connected to the module terminal 140 of the image processing module 100 when the image processing module 100 is mounted in the docking unit 211. Then, an image signal output from the image processing module 100 is transmitted to the main body terminal 240 in a wired manner when the image processing module 100 is mounted in the docking unit 211.

With the foregoing configuration, the image processing module 100 is detachably attached to the docking unit 211, and the image processing module 100 and the display main body 200 are connected to each other in a wired manner to transmit an image signal from the image processing module 100 to the display main body 200 when the image processing module 100 is mounted in the docking unit 211.

Hereinafter, a detailed configuration of the image processing module 100 and the display main body 200 of the display apparatus 1 according to the present exemplary embodiment will be described with reference to FIG. 3.

Figure 3:
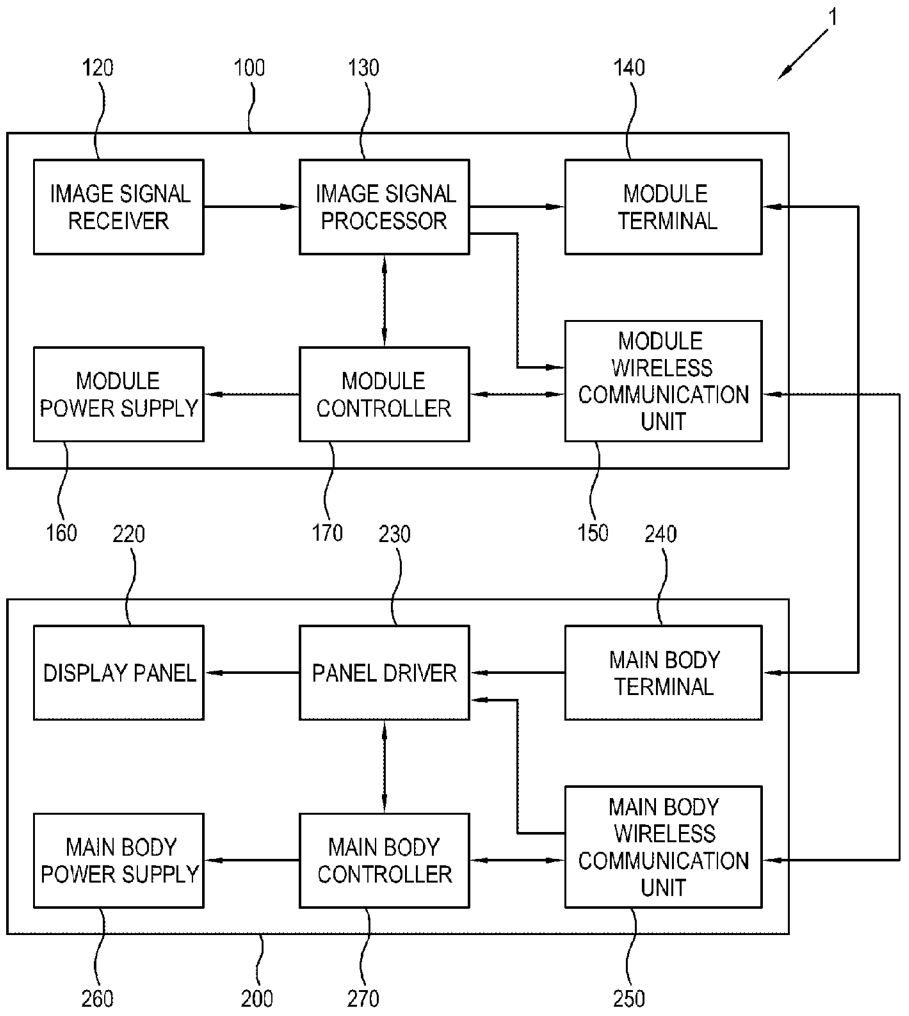
FIG. 3 is a block diagram of the display apparatus in FIG. 1, according to an exemplary embodiment.

FIG. 3 is a block diagram of the image processing module 100 and the display main body 200.

As shown therein, the image processing module 100 includes an image signal receiver 120 which receives an image signal from at least one image supply source (not shown), an image signal processor 130 which processes the image signal received by the image signal receiver 120 according to a preset image processing operation, the module terminal 140 which outputs the image signal processed by the image signal processor 130, a module wireless communication unit 150 which wirelessly transmits the image signal processed by the image signal processor 130, a module power supply 160 which supplies power to the image processing module 100 and a module controller 170 which controls operations of the image processing module 100.

The display main body 200 includes a display panel 220 on which an image is displayed, a panel driver 230 which drives the display panel 220 to display the image, the main body terminal 240 which receives an image signal, corresponding to the image displayed on the display panel 220, output from the module terminal 140 when connected to the module terminal 140 in a wired manner, a main body wireless communication unit 250 which receives an image signal transmitted wirelessly from the module wireless communication unit 150, a main body power supply 260 which supplies power to the display main body 200, and a main body controller 270 which controls operations of the display main body 200.

With the foregoing configuration, the module controller 170 and the main body controller 270 control the module wireless communication unit 150 and the main body wireless communication unit 250, respectively, or the module terminal 140 and the main body terminal 240, respectively, to selectively transmit an image signal from the image processing module 100 to the display main body 200 wirelessly or in a wired manner corresponding to the wired connection of the module terminal 140 and the main body terminal 240 by mounting the image processing module 100 in the docking unit 211. However, the foregoing selective transmission of the image signal from the image processing module 100 to the display main body 200 may be performed by only one of the module controller 170 and the main body controller 270.

According to the present exemplary embodiment, the installation type of the image processing module 100 is applicable selectively depending upon the supporting method of the display main body 200. Also, the transmission method of the image signal is applicably selectively depending upon the installation type of the image processing module 100.

For example, if the display main body 200 is supported by the stand 400, the image processing module 100 is mounted in the display main body 200 to transmit the image signal in a wired manner. If the display main body 200 is hung on the wall 5, the image processing module 100 is detached from the display main body 200 to transmit the image signal wirelessly.

Hereinafter, elements of the image processing module 100 will be described.

The image signal receiver 120 transmits to the image signal processor 130 the image signal received from the external image supply source in a wired manner or wirelessly, and may include various configurations corresponding to the standard of the received image signal or a configuration of the image supply source.

For example, the image signal receiver 120 may receive an image signal according to standards such as radio frequency (RF), composite, component, super video, Syndicat des Constructeurs d'Appareils Radiorecepteurs et Téléviseurs (SCART), high definition multimedia interface (HDMI), D-sub, digital video interactive (DVI), DisplayPort, unified display interface (UDI) or wireless high definition (HD). If the received image signal includes a broadcasting signal, the image signal receiver 120 may include a tuner to tune the broadcasting signal by channel.

The image signal receiver 120 may receive an image signal from a plurality of image supply sources, and transmit the image signal from one of the image supply sources to the image signal processor 130.

The image signal receiver 120 may be connected to an external memory device (not shown) storing therein image data such as a universal serial bus (USB) memory device (not shown) and load the image data from the external memory device onto the image signal processor 130.

The image signal processor 130 processes the image signal transmitted by the image signal receiver 120. The image processing by the image signal processor 130 may include, e.g., decoding corresponding to various image formats, deinterlacing, conversion of frame refresh rate, scaling, noise reduction for image quality improvement, and detail enhancement, but not limited thereto. The image signal processor 130 may include separate configurations to perform the foregoing processes separately or include an integrated configuration to perform the foregoing processes.

The module terminal 140 is installed in an external side of the image processing module 100 and connected to the image signal processor 130 in a wired manner to receive an image signal from the image signal processor 130. When the image processing module 100 is mounted in the docking unit 211, the module terminal 140 is connected to the main body terminal 240 of the display main body 200 to transmit the image signal processed by the image signal processor 130 from the image processing module 100 to the display main body 200 in a wired manner.

The module terminal 140 may include a connector corresponding to the main body terminal 240. The module terminal 140 may further include a data channel to transmit and receive predetermined data, information, and/or control signals in addition to an image signal channel to output an image signal, and a power channel to receive power supplied by the display main body 200.

The module wireless communication unit 150 transmits the image signal processed by the image signal processor 130, based on a wireless communication standard such as wireless HD. The module wireless communication unit 150 is activated or deactivated by the control of the module controller 170, and may transmit an image signal when activated. The module wireless communication unit 150 may perform bilateral data communication with the display main body 200 as well as transmission of an image signal.

The module power supply 160 supplies power to elements of the image processing module 100. The module power supply 160 includes at least one of a battery and an adaptor connected to an external power source. The module power supply 160 may supply power or suspend power supplied to the image processing module 100 by the control of the module controller 170.

If the image processing module 100 is mounted in the docking unit 211 to connect the module terminal 140 and the main body terminal 240, the module controller 170 shuts off power supplied to the module wireless communication unit 150 to deactivate the module wireless communication unit 150 and to output an image signal through the module terminal 140. The module controller 170 may shut off power supplied to all elements of the image processing module 100 from the module power supply 160, and controls power from the display main body 200 to be supplied to the image processing module 100 through the module terminal 140. For example, the module controller 170 may control the module terminal 140 to receive, from the display main body 200, power required to operate all the elements of the image processing module 100 except the module wireless communication unit 150.

If the image processing module 100 is detached from the docking unit 211 to disconnect the module terminal 140 and the main body terminal 240, the module controller 170 controls power to be supplied to, and activates, the module wireless communication unit 150. Then, the module terminal 170 transmits the image signal wirelessly through the module wireless communication unit 150. The module controller 170 controls the module power supply 160 to supply power to the image processing module 100 since it cannot receive power from the display main body 200 through the module terminal 140.

Determining the connection and non-connection of the module terminal 140 and the main body terminal 240 by the module controller 170 may employ various methods and does not limit the spirit of the inventive concept. For example, the module controller 170 may determine the connection and non-connection of the module terminal 140 and the main body terminal 240 depending on whether power is supplied by the display main body 200 through the module terminal 140 or depending on whether data are received from the main body controller 270 through the module terminal 140. Further, the module terminal 170 may determine the connection and non-connection of the module terminal 140 and the main body terminal 240 by a switch configuration (not shown) which is selectively pressed by the attachment and detachment of the image processing module 100.

Hereinafter, elements of the display main body 200 will be described.

The display panel 220 displays thereon an image signal, and may be a liquid crystal display (LCD) panel, but not limited thereto. The display panel 220 has two substrates (not shown) in which liquid crystal is filled, and a driving signal is applied from the panel driver 230 to the display panel 220 to control the arrangement of the liquid crystal to thereby display an image on a display area of a plate surface. The LCD panel 220 does not emit light itself, and thus, includes a backlight unit (not shown) to receive light therefrom.

The panel driver 230 applies a driving signal to the display panel 220 to drive the display panel 220 based on a received image signal. The panel driver 230 includes a source driver (not shown) to apply a voltage to a source line of the display panel 220, a gate driver (not shown) to drive a gate line of the display panel 220 and a timing controller (not shown) to control the foregoing elements at appropriate timing.

The main body terminal 240 is installed in an external side of the display main body 200 to be connected to the module terminal 140 when the image processing module 100 is mounted in the docking unit 211. The main body terminal 240 transmits to the panel driver 230 the image signal received from the module terminal 140 when connected to the module terminal 140.

The main body terminal 240 corresponds to the module terminal 140, and includes an image single channel to receive an image signal, a data channel to transmit data between the module controller 170 and the main body controller 270, and a power channel to be connected to the main body power supply 260 to transmit power.

The main body wireless communication unit 250 wirelessly receives an image signal from the image processing module 100 and transmits the image signal to the panel driver 230. The main body wireless communication unit 250 is activated or deactivated by the main body controller 270, and may receive the image signal when activated. The main body wireless communication unit 250 may perform bilateral data communication with the image processing module 100 as well as the reception of the image signal.

The main body power supply 260 converts external power into DC power at various levels, and supplies the DC power to the display main body 200, but not limited thereto. The main body power supply 260 is connected to the main body terminal 240, and may supply power to the image processing module 100 if the image processing module 100 is connected to the docking unit 211.

If the image processing module 100 is mounted in the docking unit 211 to connect the module terminal 140 and the main body terminal 240 in a wired manner, the main body controller 270 shuts off power supplied to the main body wireless communication unit 250 to deactivate the main body wireless communication unit 250, and transmits the image signal from the main body terminal 240 to the panel driver 230. The main body controller 270 controls the main body power supply 260 to supply power to the image processing module 100 through the main body terminal 240. For the performance of the foregoing operation, an additional switching circuit (not shown) which is switched on and off by the main body controller 270 may be provided to supply power from the main body power supply 260 to the main body terminal 240.

If the image processing module 100 is detached from the docking unit 211 to disconnect the module terminal 140 and the main body terminal 240, the main body controller 270 controls power to be supplied to, and activates, the main body wireless communication unit 250, and controls the main body wireless communication unit 250 to receive the image signal from the image processing module 100.

With the foregoing configuration, if the module controller 170 and the main body controller 270 determine that the image processing module 100 is mounted in the docking unit 211 to connect the module terminal 140 and the main body terminal 240, they deactivate the module wireless communication unit 150 and the main body wireless communication unit 250, respectively. As the module terminal 140 and the main body terminal 240 are connected to each other, the image signal is transmitted from the image processing module 100 to the display main body 200 through the module terminal 140 and the main body terminal 240. The module controller 170 controls the module power supply 160 to suspend power supply, and controls power from the main body power supply 260 to be supplied to the image processing module 100.

Figure 4:
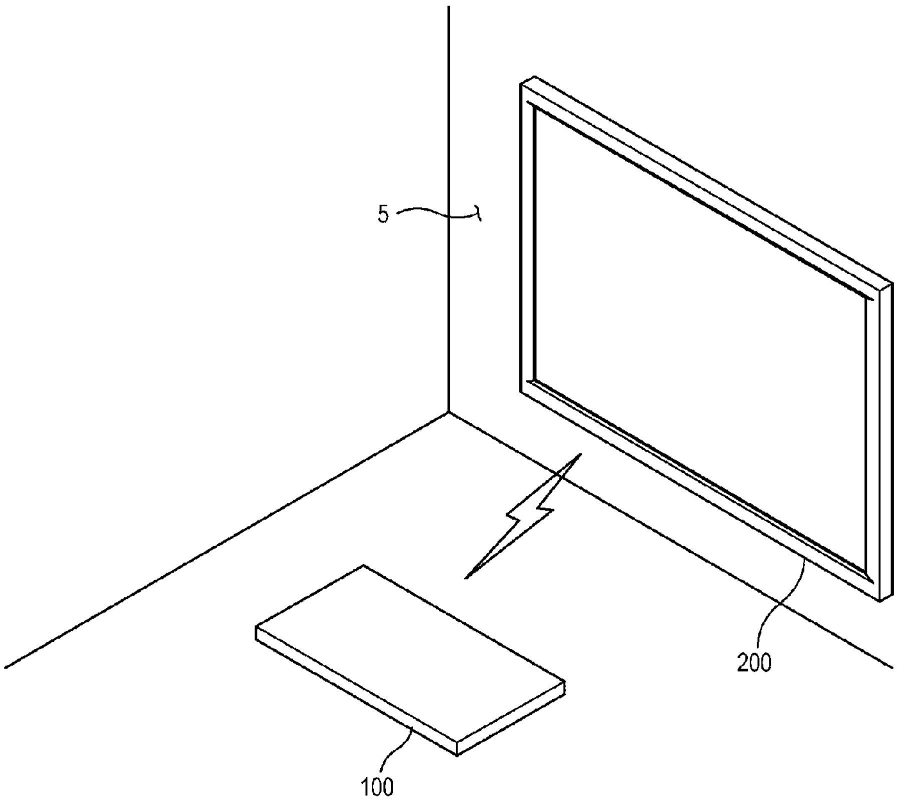
FIG. 4 illustrates the display apparatus whose display main body is hung on the wall, according to an exemplary embodiment.

FIG. 4 illustrates the display main body 200 which is hung on the wall 5.

As shown therein, like the case when the display main body 200 is hung on the wall 5, the detachment of the image processing module 100 from the docking unit 211 may be considered depending on the change in the usage environment.

In this case, the module controller 170 and the main body controller 270 determine that the module terminal 140 and the main body terminal 240 are disconnected from each other and activate the module wireless communication unit 150 and the main body wireless communication unit 250, respectively. The module controller 170 and the main body controller 270 control the image signal to be transmitted from the image processing module 100 to the display main body 200 based on the wireless communication between the module wireless communication unit 150 and the main body wireless communication unit 250. The module controller 170 controls power to be supplied from the module power supply 160 to the image processing module 100 as the power supplied by the main body power supply 260 is shut off.

According to the present exemplary embodiment, the display apparatus 1 may be divided into the image processing module 100 receiving and processing the image signal and the display main body 200 displaying the image, and the display apparatus 1 may selectively activate the internal wireless communication configuration to supply power corresponding to the wired connection according to the image processing module 100 mounted in the display main body 200.

Figure 5:
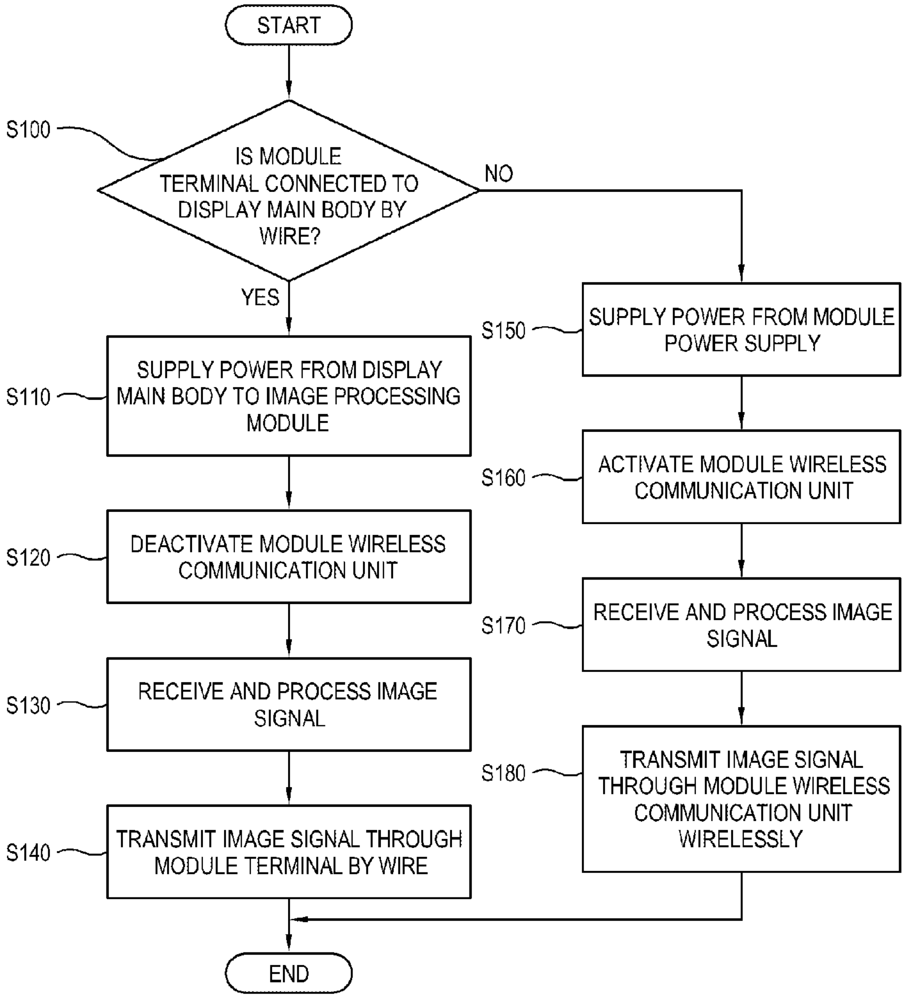
FIG. 5 is a control flowchart of a control method of an image processing module of the display apparatus in FIG. 1, according to an exemplary embodiment.

Hereinafter, a control method of the image processing module 100 will be described with reference to FIG. 5. FIG. 5 is a control flowchart of the control method of the image processing module 100, according to an exemplary embodiment.

As shown therein, the module controller 170 determines whether the module terminal 140 is connected to the display main body 200 in a wired manner (S100).

If it is determined that the module terminal 140 is connected to the display main body 200 in a wired manner, the module controller 170 controls power from the display main body 200 to be supplied to the image processing module 100 (S110). The module controller 170 deactivates the module wireless communication unit 150 (S120).

If the image signal received by the image signal receiver 120 is processed by the image signal processor 130 (S130), the module controller 170 transmits the image signal processed by the image signal processor 130 in a wired manner, through the module terminal 140 (S140).

If it is determined at operation S100 that the module terminal 140 is not connected to the display main body 200 in a wired manner, the module controller 170 controls the module power supply 160 to supply power to the image processing module 100 and activates the module wireless communication unit 150 (S160).

If the image signal is processed by the image signal processor 130 (S170), the module controller 170 controls the module wireless communication unit 150 to transmit the image signal wirelessly (S180).

Figure 6:
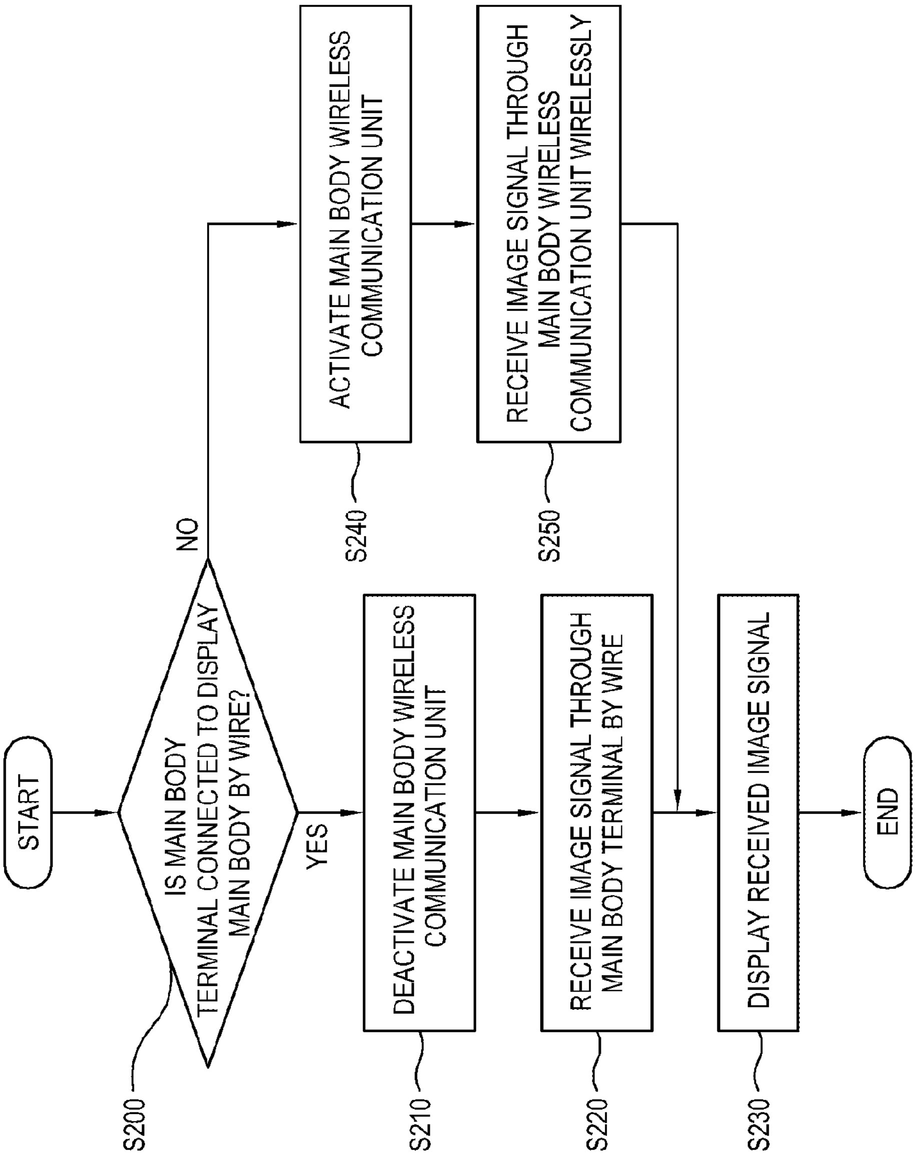
FIG. 6 is a control flowchart of a control method of the display main body of the display apparatus in FIG. 1, according to an exemplary embodiment.

Hereinafter, the control method of the display main body 200 will be described with reference to FIG. 6. FIG. 6 is a control flowchart of the control method of the display main body 200, according to an exemplary embodiment.

As shown therein, the main body controller 270 determines whether the main body terminal 240 is connected to the image processing module 100 in a wired manner (S200).

If it is determined that the main body terminal 240 is connected to the image processing module 100 in a wired manner, the main body controller 270 deactivates the main body wireless communication unit 250 (S210), and controls the main body terminal 240 to receive the image signal in a wired manner (S220). The main body controller 270 transmits the image signal to the panel driver 230 and displays the image on the display panel 220 (S230).

If it is determined at operation S200 that the main body terminal 240 is not connected to the image processing module 100 in a wired manner, the main body controller 270 activates the main body wireless communication unit 250 (S240), and wirelessly receives the image signal through the main body wireless communication unit 250 (S250).

According to the foregoing processes, the operations of the image processing module 100 and the display main body 200 are controlled.

According to the foregoing exemplary embodiments, the display main body 200 includes the main body wireless communication unit 250, but not limited thereto. Alternatively, according to an exemplary embodiment as shown in FIG. 7, a display apparatus 2 may include a communication module 300 which is detachably attached to a display main body 201 and performs a wireless communication with the image processing module 100 instead of the display main body 201 including the configuration to wirelessly communicate with the image processing module 100.

Figure 7:
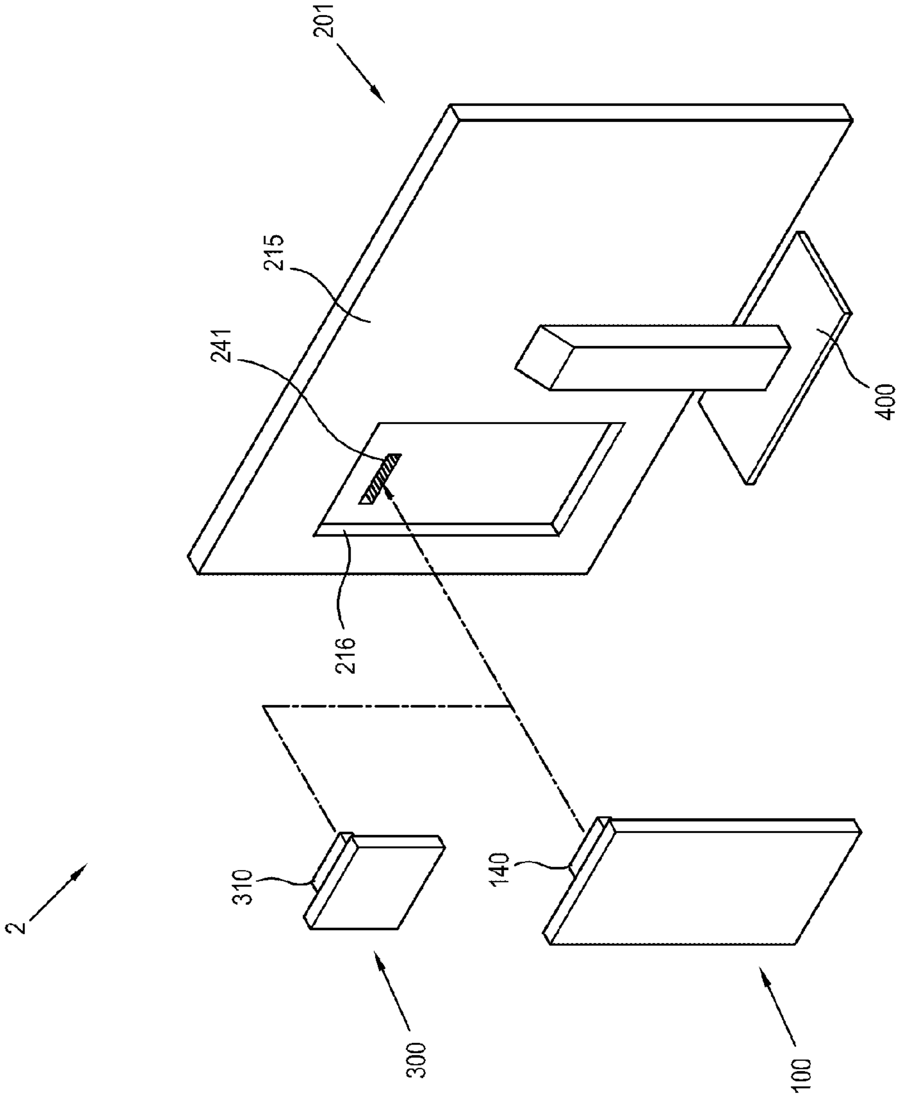
FIG. 7 illustrates a display apparatus whose display main body is supported by a stand, according to another exemplary embodiment.

FIG. 7 is a perspective view of the display apparatus 2 in which the display main body 201 is supported by the stand 400.

As shown therein, the display apparatus 2 according to the present exemplary embodiment includes the image processing module 100 to receive and process an image signal, the display main body 201 to display an image thereon based on the image signal processed by the image processing module 100, and the communication module 300 detachably attached to the display main body 201 and relaying an image signal between the image processing module 100 and the display main body 201.

A docking unit 216 is provided in a rear side of a housing 215 of the display main body 201, and the image processing module 100 or the communication module 300 is detachably attached to the docking unit 216. The display main body 201 includes a main body terminal 241 which is provided in the docking unit 216 to allow the image processing module 100 or the communication module 300 to be connected to the display main body 201 in a wired manner.

If the image processing module 100 is mounted in the docking unit 216, the module terminal 140 of the image processing module 100 is connected to the main body terminal 241 in a wired manner. This is the same as that according to the foregoing exemplary embodiment, and thus, detailed descriptions will be omitted.

If the image processing module 100 is detached from the docking unit 216, a user mounts the communication module 300 in the docking unit 216. If the communication module 300 is mounted in the docking unit 216, the communication module terminal 310 of the communication module 300 is connected to the main body terminal 241. Then, the communication module 300 may transmit the image signal received wirelessly from the image processing module 100 to the display main body 201.

To directly transmit the image signal from the image processing module 100 to the display main body 201 in a wired manner, a user detaches the communication module 300 from the docking unit 216 and mounts the image processing module 100 in the docking unit 216.

Figure 8:
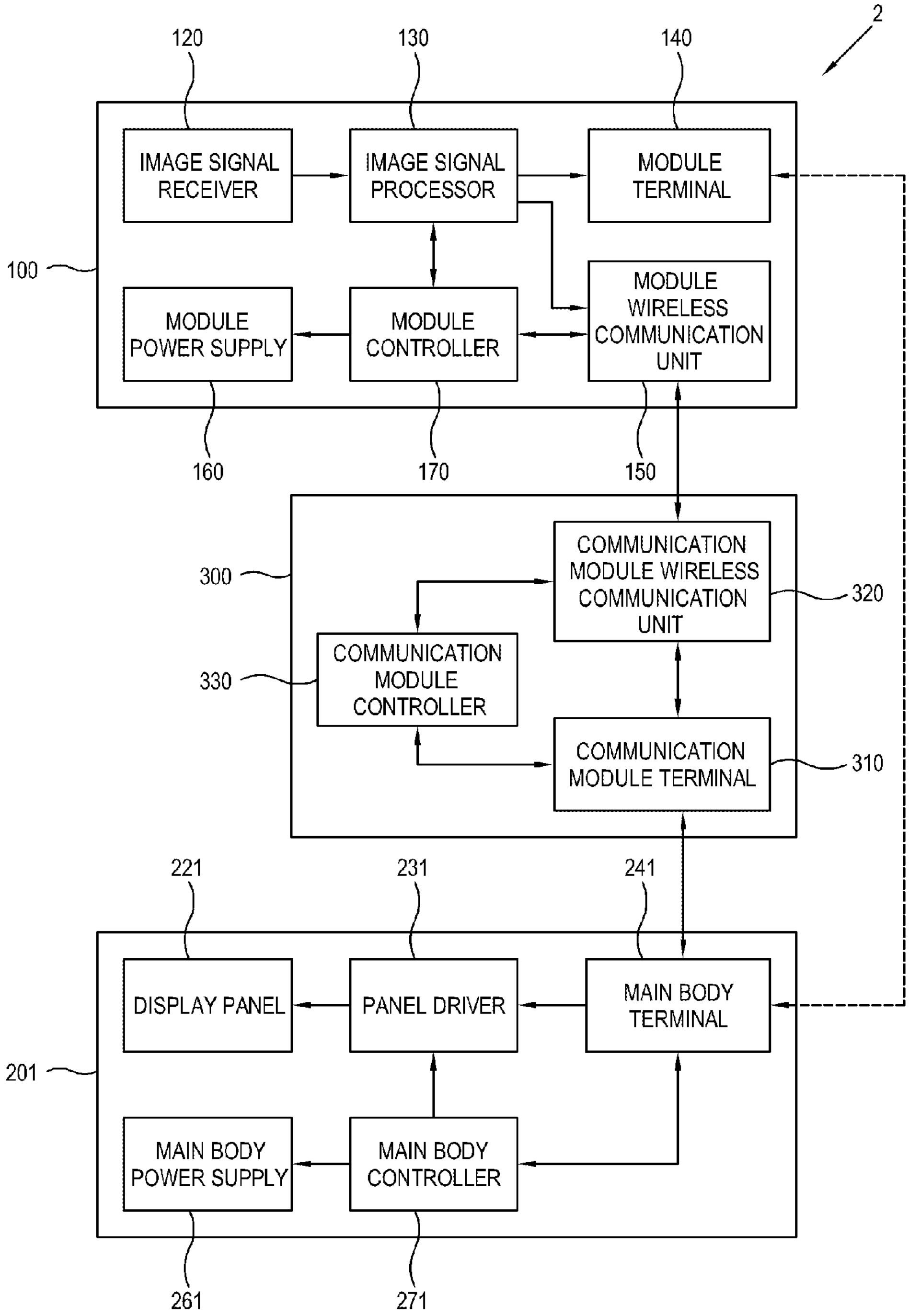
FIG. 8 is a block diagram of the display apparatus in FIG. 7, according to an exemplary embodiment.

Hereinafter, a detailed configuration of the display apparatus 2 according to the present exemplary embodiment will be described with reference to FIG. 8. FIG. 8 is a block diagram of the display apparatus 2.

As shown therein, the image processing module 100 includes the image signal receiver 120, the image signal processor 130, the module terminal 140, the module wireless communication unit 150, the module power supply 160 and the module controller 170. The foregoing elements are substantially the same as those according to the foregoing exemplary embodiment, and thus, detailed descriptions will be omitted.

The display main body 201 includes a display panel 221, a panel driver 231, a main body terminal 241, a main body power supply 261, and a main body controller 271. The display panel 221, the panel driver 231, the main body terminal 241 and the main body power supply 261 are substantially the same as those according to the foregoing exemplary embodiment, and thus, detailed descriptions will be omitted.

The communication module 300 includes a communication module terminal 310 which is connected to the main body terminal 241 when the communication module 300 is mounted in the docking unit 216, a communication module wireless communication unit 320 which receives an image signal transmitted wirelessly from the image processing module 100 and transmits the image signal to the communication module terminal 310, and a communication module controller 330 which selectively activates the communication module wireless communication unit 320 corresponding to a wired connection of the communication module terminal 310 and the main body terminal 241.

If a user mounts the communication module 300 in the docking unit 216 after detaching the image processing module 100 from the docking unit 216, the main body terminal 241 and the communication module terminal 310 are connected to each other in a wired manner. Then, power is supplied from the main body power supply 261 to the communication module 300 through the main body terminal 241 and the communication module terminal 310.

The communication module controller 330 and the communication module wireless communication unit 320 are activated by the power supply as above. The communication module controller 330 transmits the image signal which is received wirelessly to the module wireless communication unit 150 from the communication module wireless communication unit 320, to the main body terminal 241 through the communication module terminal 310 in a wired manner.

The image signal which is transmitted to the main body terminal 241 is transmitted to the panel driver 231 to thereby display an image on the display panel 221.

As the display main body 201 does not have an internal wireless communication module but employs the communication module 300 detachably mounted in the docking unit 216 instead of the image processing module 100, the image signal may be transmitted in a wired manner or wirelessly depending on whether the image processing module 100 is attached to the display main body 201.

According to the present exemplary embodiment, the communication module 300 includes the communication module controller 330, but not limited thereto. Alternatively, the communication module 300 does not include an additional controller such as the communication module controller 330 and may be controlled by the main body controller 271 when the communication module terminal 310 is connected to the main body terminal 241. The communication module 300 may include an additional power source such as a battery. The communication module controller 330 may detect the connection and non-connection of the communication module terminal 310 and the main body terminal 241, and deactivate the communication module wireless communication unit 320.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:

an image processing module which comprises:

an image signal processor which processes an image signal received from the outside;

a module terminal which transmits the image signal processed by the image signal processor in a wired manner;

a module wireless communication unit which transmits wirelessly the image signal processed by the image signal processor; and a module controller which selectively controls the module terminal or the module wireless communication unit to transmit the image signal in a wired manner or wirelessly, respectively; and a display main body which comprises:

a display panel;

a docking unit which is configured to detachably mount the image processing module therein;

a main body terminal which receives the image signal transmitted from the module terminal if the module terminal is connected to the main body terminal through the docking unit;

a main body wireless communication unit which receives the image signal wirelessly transmitted from the module wireless communication unit; and a main body controller which selectively controls the main body terminal or the main body wireless communication unit to receive the image signal in the wired manner or wirelessly; respectively, wherein the module controller and the main body controller control the image signal to be transmitted from the module terminal to the main body terminal in the wired manner or from the module wireless communication unit to the main body wireless communication unit wirelessly, depending on whether the module terminal is connected to the main body terminal.

2. The display apparatus according to claim 1, wherein the module controller and the main body controller activate the module wireless communication unit and the main body wireless communication unit, respectively, if the module terminal is not connected to the main body terminal, and deactivate the module wireless communication unit and the main body wireless communication unit, respectively, if the main body terminal is connected to the module terminal.

3. The display apparatus according to claim 1, wherein the image processing module further comprises a module power supply which is configured to supply power to operate the image processing module, and wherein the module controller controls the module power supply to supply the power to the image processing module, if the module terminal is not connected to the main body terminal.

4. The display apparatus according to claim 3, wherein the module power supply comprises at least one of a battery and an adaptor connected to an external power source.

5. The display apparatus according to claim 3, wherein the display main body further comprises a main body power supply which supplies power to operate the display main body, and wherein the module controller shuts off power supplied from the module power supply to the image processing module and controls the module terminal to receive power to operate the image processing module from the main body power supply through the main body terminal, if the module terminal is connected to the main body terminal.

6. The display apparatus according to claim 3, wherein the display main body further comprises a main body power supply which supplies power to operate the display main body, and wherein the module controller shuts off power supplied by the module power supply to the image processing module and controls the module terminal to receive power, to operate the image processing module except the module wireless communication unit, from the main body power supply through the main body terminal, if the module terminal is connected to the main body terminal.

7. The display apparatus according to claim 1, wherein the display main body further comprises a panel driver which drives the display panel to thereby display an image on the display panel based on the image signal transmitted from the image processing module.

8. The display apparatus according to claim 1, wherein the display panel is provided in a front side of the display main body, and the docking unit is provided in a rear side of the display main body.

9. The display apparatus according to claim 1, wherein the display main body is supported by a stand on a surface or hung on the wall.

10. The display apparatus according to claim 1, wherein the main body wireless communication unit is configured to be detachably mounted in the docking unit.

11. The display apparatus according to claim 10, wherein the main body wireless communication unit comprises:

a communication module wireless communication unit which receives the image signal transmitted wirelessly from the module wireless communication unit; and a communication module terminal which is connected to the main body terminal in a wired manner if the main body wireless communication unit is mounted in the docking unit, and transmits the image signal from the communication module wireless communication unit to the main body terminal.

12. The display apparatus according to claim 11, wherein the communication module receives power from the display main body through the communication module terminal if the main body wireless communication unit is mounted in the docking unit.

13. A display apparatus comprising:

an image processing module which comprises:

an image signal processor which processes an image signal received from an outside;

a module terminal which transmits the image signal processed by the image signal processor in a wired manner; and a module wireless communication unit which transmits wirelessly the image signal processed by the image signal processor;

a display main body which comprises:

a main body terminal which receives the image signal transmitted from the module terminal which is detachably connected to the main body terminal;

a main body wireless communication unit which receives the image signal transmitted from the module wireless communication unit; and a display unit which displays an image corresponding to the image signal; and a controller which controls the image signal to be transmitted selectively from the module terminal to the main body terminal or from the module wireless communication unit to the main body wireless communication unit.

14. The display apparatus of claim 13, wherein the controller controls the image signal to be transmitted from the module terminal to the main body terminal, if the module terminal is connected to the main body terminal, and wherein the controller controls the image signal to be transmitted from the module wireless communication unit to the main body wireless communication unit, if the module terminal is not connected to the main body terminal.

15. The display apparatus of claim 13, wherein the image processing module further comprises a module power supply which is configured to supply power to operate the image processing module, and wherein the controller controls the module power supply to supply the power to the image processing module, if the module terminal is not connected to the main body terminal.

16. The display apparatus of claim 15, wherein the display main body further comprises a main body power supply which supplies power to operate the display main body, and wherein the controller shuts off power supplied from the module power supply to the image processing module and controls the module terminal to receive power to operate the image processing module from the main body power supply through the main body terminal, if the module terminal is connected to the main body terminal.

17. The display apparatus of claim 15, wherein the display main body further comprises a main body power supply which supplies power to operate the display main body, and wherein the controller shuts off power supplied by the module power supply to the image processing module and controls the module terminal to receive power, to operate the image processing module except the module wireless communication unit, from the main body power supply through the main body terminal, if the module terminal is connected to the main body terminal.

18. The display apparatus of claim 13, wherein the main body wireless communication unit is configured to be detachably mounted in the docking unit.

19. The display apparatus according to claim 18, wherein the main body wireless communication unit comprises:

a communication module wireless communication unit which receives the image signal transmitted wirelessly from the module wireless communication unit; and a communication module terminal which is connected to the main body terminal in a wired manner if the main body wireless communication unit is mounted in the docking unit, and transmits the image signal from the communication module wireless communication unit to the main body terminal.

20. The display apparatus according to claim 19, wherein the communication module receives power from the display main body through the communication module terminal if the main body wireless communication unit is mounted in the docking unit.

* * * * *